Aug. 13, 1946.   J. MacMANUS   2,405,661
METHOD AND APPARATUS FOR FORMING PERFORATED PIE COVERINGS
Filed Aug. 20, 1942   2 Sheets-Sheet 1
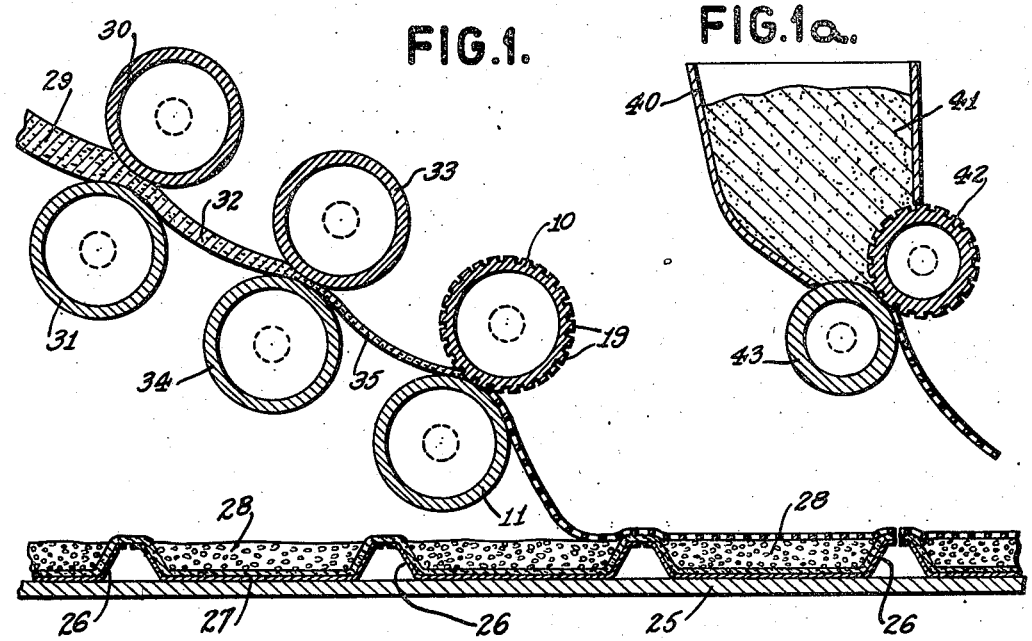
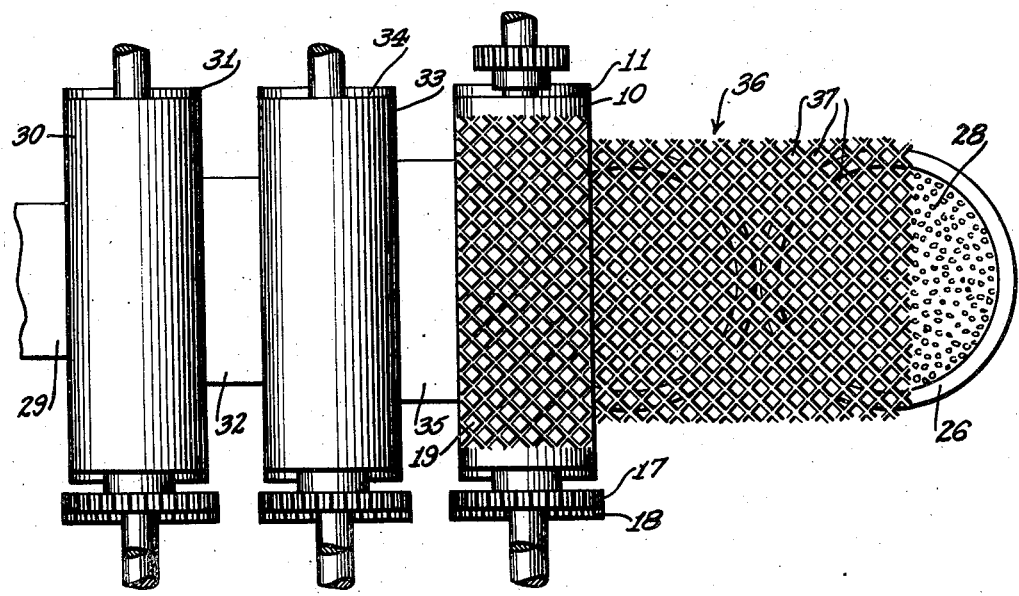
INVENTOR
JOHN MAC MANUS
BY John C. Kerr
ATTORNEY Aug. 13, 1946.   J. MacMANUS   2,405,661
METHOD AND APPARATUS FOR FORMING PERFORATED PIE COVERINGS
Filed Aug. 20, 1942   2 Sheets-Sheet 2
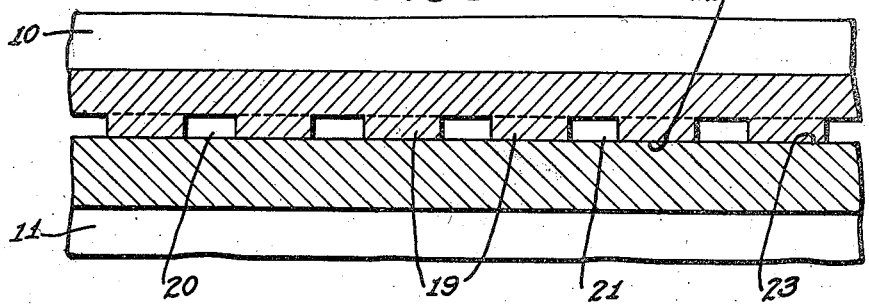
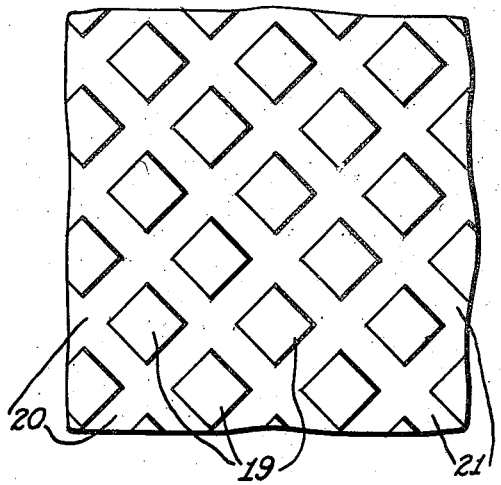
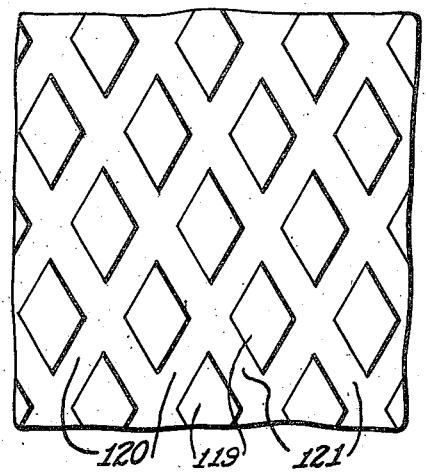
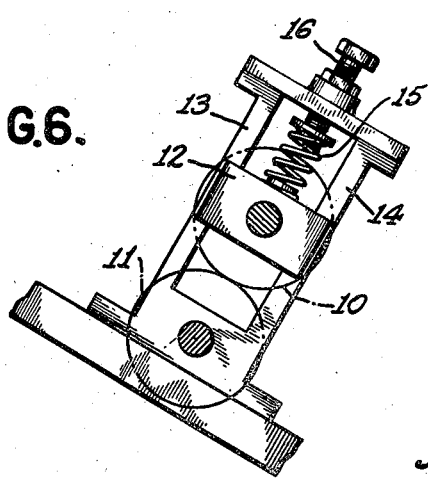
INVENTOR
JOHN MACMANUS
BY John R. Kerr
ATTORNEY Patented Aug. 13, 1946

2,405,661

UNITED STATES PATENT OFFICE 2,405,661

METHOD AND APPARATUS FOR FORMING PERFORATED PIE COVERINGS

John MacManus, Yonkers, N. Y., assignor to Cushman's Sons Inc., New York, N. Y., a corporation of New York Application August 20, 1942, Serial No. 455,412

6 Claims. (Cl. 107—54)

This invention relates to the forming of perforated pie coverings.

Among the objects of the present invention is to provide a method and means to produce a pie covering having perforations through which pie filling is exposed and by which a perforated pie covering is made with a minimum of wastage from a given mass of dough as contained in an orginial batch or an original sheet or other blank.

Pie coverings of the lattice type, unless formed by the individual placement of strips of dough in a criss-cross arrangement, commonly have been prepared by the use of a cutting die by which spaced areas of dough are cut from an imperforate blank. The pieces of dough cut from the blank constitute scrap which can be and often is reclaimed for making additional pie dough. Unless reclaimed there is a considerable waste. When reclaimed, pie covering made from scrap, whether it is mixed with a fresh batch of dough or not, is of an inferior grade because of the age of the scrap and the additional working it necessarily receives. Should the practice be adopted of mixing scrap with fresh dough, it is apparent that each subsequent batch of dough so prepared would contain some of the dough of the initial batch with the result that pie crusts made from successive batches would become increasingly poorer in quality. For example, if proposed pie coverings are to have, say, 50% of their areas open, the coverings made from a second batch of dough would contain 50% scrap, and the coverings made from a third batch of dough would constitute 50% freshly made dough, 25% from the next previous batch and 25% from the initial batch. And so long as the scrap of a previous batch were used there would always be some of the initial batch of dough in succeeding batches. Consequently for improving the quality of pie crust, it is very desirable that the use of scrap be avoided, and the present invention has the object of attaining this end and also the further object of eliminating the hand work formerly used in cutting out pieces of dough to form openings and to rework and mix scrap material.

Another object of the invention is to provide a method and apparatus for producing a continuous perforated pie covering.

Referring to the drawings:

Fig. 1 illustrates apparatus for forming a continuous perforated pie covering;

Fig. 1a illustrates the forming of perforated pie covering from a mass of dough;

Fig. 2 is the plan of the apparatus illustrated in Fig. 1;

Fig. 3 is a section of the surfaces of the forming rolls of the apparatus shown in Fig. 1 on a plane through their axes;

Fig. 4 is a development of one of the forming rolls;

Fig. 5 is illustrative of an alternative development for a forming roll; and

Fig. 6 is an elevational view of the end supports and bearings for the forming rolls.

The principle employed in accomplishing the objects of this invention contemplates the use of moving surfaces having such configuration and association with one another as will cause the forming of a perforated sheet of dough from a mass of dough or from an imperforate sheet of dough. The forming is attained by the displacement or extrusion of the dough in such a manner that the various contained particles of the dough are rearranged and caused to assume such a relationship as to leave a pattern of openings without discarding any of the original dough. I have found that these results can be accomplished in a practical manner by the use of a pair of forming or swaging rolls arranged with their peripheral surfaces contacting. It is desirable that at least one of the rolls be provided with a pattern indented in its surface. I have attained satisfactory results by fashioning one roll in such manner and by using a plain surface roll to cooperate with the pattern roll. Two of such rolls are illustrated in Fig. 1 of the drawings which shows a pattern roll 10 and a smooth roll 11. These two rolls are mounted in bearings in such a manner as to assure that the peripheral surfaces of the rolls be maintained in contacting relationship during use. The rolls can be made of steel or of other firm material suitable for the purpose.

If desired, one of the rolls may be mounted in movable bearings, 12, which can be arranged to slide in conventional guides 13, 14, Fig. 6. When this construction is used, it is desirable that a stout spring 15 be interposed between the adjusting screw 16 and the bearing 12 to assure that the rolls be held together constantly during use.

The rolls are power driven. It is convenient to connect the two rolls together by gears 17, 18, as illustrated in Figure 2, and to drive to either one, but, if desired, the gears can be dispensed with. When connecting gears are dispensed with and power is applied to the patterned roll, the smooth roll will be driven through friction. Whether the second roll is positively driven or driven through frictional contact the contacting surfaces of the two rolls move at the same linear velocity.

The development of the surface of the roll 10 may be as illustrated in Fig. 4. In this development the rectangles constitute bosses 19. These bosses have cylindrical surfaces coinciding with the periphery of roll 10. The bosses may be formed by milling grooves or channels 20 and 21 crosswise to each other with a plurality of parallel channels 20 intersecting another set of parallel channels 21 in the surface 22 of the pattern roll.

Figure 3 illustrates a section through the rolls on a line of contact between the surfaces 22 and 23 of the respective rolls. From this figure it is seen that the intersecting sets of grooves 20 and 21 leave islands therebetween in the form of bosses 19. The mean peripheral area of a single boss corresponds to the size of the perforation to be formed in the open pie covering. The width and depth of the grooves 20 and 21 determine the size of the bars of the lattice or solid portion of the dough in the final pie covering. These factors can be proportioned to suit the effect desired and the ratio of the solid area to the open area.

It is evident from Fig. 3 that instead of having a single pattern roll and a single smooth surface roll, each roll could be provided with the same pattern in registration with the other, in which event the depth of the grooves would be distributed in the depths of the cuts in the two surfaces of the rolls. By so doing, the thickness of the perforated sheet could be made to correspond with that produced by the depth of the grooves 20 and 21.

In Fig. 5 I have illustrated a second development wherein the intersecting grooves 120 and 121 have less pitch than the pitch of grooves 20 and 21. The result is that the bosses 119 are lozenge in shape with the longest axis of each lozenge circumferentially disposed. It is of course possible to further alter the shape of the bosses and to change their proportional area with respect to the area of the grooves. The grooves too, while being illustrated as straight, may be made to assume other forms, such as sinusoidal, for example.

In Figs. 1 and 2 I have illustrated my invention with apparatus for forming a continuous strip of perforated pie covering. The forming rolls are shown in association with a traveling conveyor 25 which carries a series of filled pie plates 26 past the forming rolls 10 and 11. The series of pie plates 26, having first received a bottom layer of dough 27 and filling material 28, is caused to pass beneath the forming rolls 10 and 11 at a rate to synchronize with the delivery of a perforated sheet of dough from the rolls. This arrangement can be used in a continuous process for completely making pies.

Before being worked by rolls 10 and 11, the dough is suitably mixed and worked to prepare it. The dough should have the usual plastic consistency. As illustrated in Fig. 1 a thick ribbon or slab of dough 29 is reduced and extended by a pair of smooth rolls 30, 31, and the ribbon 32 formed thereby is further sheeted by a sheeting device having rolls 33 and 34 which reduces the ribbon 32 to a strip 35 of desired thickness and width. It is apparent that in view of the different thicknesses of the strips of dough between the several pairs of rolls it is desirable to drive the pairs of rolls at different lineal velocities so as to cause drag and attendant drawing out of the length of the dough between pairs of rolls. Variable speed mechanism such as is commonly used for this purpose may be employed. It is important only that the amount of dough in the sheet 35 is in sufficient quantity to be properly worked and suitably expanded by the forming rolls 10 and 11. It is understood that the rolls and the dough are suitably dusted with flour throughout the process to assure that the dough freely leaves each pair of rolls.

One effect of the different spacings between the sheeting rolls of each pair 30, 31 and 33, 34 is to cause a widening of the strip as well as a reduction in thickness. This is intended to be generally illustrated in Figure 2.

The forming rolls, owing to the configuration of their surfaces, cause an expansion of the imperforate sheet received thereby to a sheet 36 of greater over-all area having perforations 37. This is caused by the contacting of the cylindrical surfaces 22 of the bosses with the peripheral surface 23 of the smooth faced roll and consequent swaging and displacement of the dough along the pattern defined by the intersecting grooves between the bosses. The displacement is lateral as well as longitudinal of the direction of movement of the sheet. As the dough is sufficiently plastic, it will flow in the grooves as it passes through the forming rolls and be thereby formed into an unbroken reticulated pattern.

The apparatus makes it possible to form a perforated sheet of unlimited length for use in a continuous process of manufacturing pies and the amount of waste dough can be minimized by gauging the width of the supply sheet received by the forming rolls. For a given thickness of a supply sheet, the width of the supply sheet determines the width of the perforated sheet which preferably should be only sufficient to accommodate the width of the pie plates being covered.

The apparatus illustrated in Figs. 1 and 2 has sheeting devices for working and gauging the thickness of a continuous strip of dough preceding the introduction of the dough to the forming rolls. If desired a mass of previously prepared dough may be fed directly to the forming rolls without having been previously sheeted or extended into a strip or blank of predetermined thickness. This accomplishment is demonstrated by the device of Fig. 1a, which shows a hopper 40 containing a batch or mass of dough 41 which is directed to the forming rolls 42, 43 through an opening in the bottom of the hopper. This opening is sufficiently wide lengthwise of the rolls to anticipate the lateral spread of the dough passing through the forming rolls to form a perforated pie covering of a desired width. The forming rolls can be rotated by hand power, or by mechanical power operating in synchronism with other units of a pie making machine.

It is apparent that the pie covering made in accordance with the herein described process is an integrally formed disk or strip interspersed with perforations in accordance with the pattern of the forming rolls or dies, and that the area and thickness of the sheet of perforated dough can be adjusted according to needs by suitably proportioning the pattern characteristics of the forming rolls.

This process may be used in making all kinds of pies, such as cherry and berry pies, with which lattice coverings are desired.

What is claimed is:

1. In a method for forming a perforated sheet of dough, the steps comprising forming a ribbon of dough and expanding said ribbon into a wider ribbon by displacing the dough and distributing it within the uppermost and lowermost planes of the formed ribbon with dies which leave perforations therein.

2. In a method for forming a perforated sheet of dough, the steps comprising forming dough into a sheet, and working said sheet of dough into a sheet of larger area while forming perforations therein without removing dough from the sheet.

3. In apparatus for forming a perforated sheet of dough, the combination comprising a pair of rolls, bearings supporting said rolls with their peripheral surfaces of revolution constantly in contact with each other so as to exclude dough from passing between the contacting elements of the surfaces of revolution, one of said rolls being plain-faced and the other of said rolls having in its surface two intersecting groups of grooves, the grooves being pitched with respect to the elements of the surfaces of revolution of the respective rolls at their line of contact and the grooves of each group being oppositely pitched with respect to the grooves of the other group, and means for rotating said rolls towards each other so as to transform dough passing therebetween into a perforated, lattice-like sheet by the molding action of the contacting roll surfaces and grooves.

4. In apparatus for forming a perforated sheet of dough, the combination comprising a pair of rolls, means rotatively supporting said rolls in contacting relationship along coinciding elements in their respective surfaces of revolution, one of said rolls having a group of grooves in its peripheral surfaces which are pitched with respect to the contacting line of the rolls and another group of grooves oppositely pitched with respect to the contacting line of the rolls, the first-named grooves intersecting the second-named grooves and all of said grooves being of substantially the same depth and of uniform cross-section.

5. In apparatus for forming a perforated sheet of dough, the combination comprising a pair of rolls, means rotatively supporting said pair of rolls with elements of their surfaces of revolution defining a line of contact between the rolls, the surface of one of said rolls being plain and the surface of the other of said rolls being interrupted by oppositely pitched groups of grooves intersecting the line of contact between the rolls and all of said grooves angularly crossing the line of contact between the rolls, bosses between said grooves which extend to the surface of the roll and of which there is always some parts of the peripheral surfaces of the bosses in contact with the peripheral surface of the plain-faced roll during rotation of the rolls, and means for rotating the rolls whereby the bosses displace dough from between the peripheral surfaces on the bosses and the plain surface on the companion roll with which they contact during rotation of the rolls.

6. In apparatus for forming a perforated sheet of dough, the combination comprising a pair of hard-surfaced rolls, one of said rolls having grooves in its surface separating a plurality of bosses extending to the surface of the roll, said channels being helically disposed and angularly intersecting the line of contact between the rolls, means for rotatively supporting said rolls, and spring-pressed means for pressing the peripheral surfaces of revolution of said rolls into contact with each other so as to cause dough to be excluded from between said surfaces and caused to enter said grooves during rotation of the rolls.

JOHN MacMANUS.